United States Patent [19]

Bortman

[11] Patent Number: 4,796,325
[45] Date of Patent: Jan. 10, 1989

[54] ANGULARLY ADJUSTABLE DOUBLE HEADED TOOTHBRUSH

[76] Inventor: Issar Bortman, 20441 NE. 30 Ave. #324, N. Miami, Fla. 33180

[21] Appl. No.: 114,045

[22] Filed: Oct. 29, 1987

[51] Int. Cl.$^4$ .............................................. A46B 9/04
[52] U.S. Cl. ................................... 15/167.2; 15/172; 15/144 A; 403/142
[58] Field of Search ............... 15/167.1, 167.2, 144 A, 15/172; 403/90, 141, 142

[56] References Cited

U.S. PATENT DOCUMENTS

| | | | |
|---|---|---|---|
| 541,727 | 6/1895 | Dennis | 15/172 |
| 1,779,057 | 10/1930 | Tolmach | 15/144 A |
| 2,749,567 | 6/1956 | Kreuger | 15/172 |
| 3,953,907 | 5/1976 | Froidevaux | 15/167.2 |
| 4,654,922 | 4/1987 | Chen | 15/144 A X |

Primary Examiner—Peter Feldman
Attorney, Agent, or Firm—Jerry T. Kearns

[57] ABSTRACT

A toothbrush has a brush portion pivotally connected to the handle. The head portion of the toothbrush may be provided with a pair of opposed facing brushes for simultaneously brushing both sides of a tooth. Three different pivotal mechanisms may be utilized for securing the head portion of the toothbrush to the handle at a selected angular adjustment. In a first embodiment, a slip ring is utilized to squeeze a collet around a pivot ball. In a second embodiment, a pivot ball is retained in adjusted position by frictional engagement with a socket in the handle of the brush. In a third embodiment, a threaded sleeve is utilized to lock a pivot ball attached to the head portion of the toothbursh in an adjusted position.

2 Claims, 3 Drawing Sheets

ANGULARLY ADJUSTABLE DOUBLE HEADED TOOTHBRUSH

BACKGROUND OF THE INVENTION

1. Field of the Invention

The present invention relates to toothbrushes, and more particularly pertains to a new and improved angularly adjustable double headed toothbrush. Various types of prior art toothbrushes are known which are provided with fixed angled connections between the head portion and the handle portion of the toothbrush. Although these fixed angled brushes provide a proper angle for some selected teeth in a mouth of a user, teeth in other locations require a different angle of the brush head. Also, the proper brush angle depends upon the individual configuration of each user's mouth. In order to overcome these problems, the present invention provides a selectively adjustable pivotal connection between a handle and a head portion of a toothbrush. The toothbrush is preferably provided with two facing brushes for simultaneously brushing both sides of a tooth.

2. Description of the Prior Art

Various types of toothbrushes are known in the prior art. A typical example of such a toothbrush is to be found in U.S. Design Pat. No. 41,285, which issued to J. Kress on Apr. 4, 1911. This patent discloses a toothbrush having opposed facing brushes. U.S. Design Pat. No. 44,997, which issued to C. Carroll on Dec. 9, 1913, discloses a toothbrush having a pair of angled brush portions. U.S. Design Pat. No. 47,100, which issued to C. Boccia on Mar. 16, 1915, discloses a toothbrush having a semicircular head portion provided with facing brush portions. U.S. Design Pat. No. 48,666, which issued to C. Boccia on Mar. 7, 1916, discloses a toothbrush having a Y-shaped head with two opposed brushes on the ends of the legs of the Y. U.S. Design Pat. No. 237,326, which issued to A. Sims on Oct. 28, 1975, discloses a toothbrush which resembles a pair of tweezers and which has opposed facing brushes. U.S. Design Pat. No. 240,095, which issued to A. Sims on June 1, 1976, discloses a toothbrush having a head portion provided with angularly attached opposed facing brushes.

While the above mentioned devices are suited for their intended usage, none of these devices provides a toothbrush which has a selectively adjustable pivotal connection between the head portion and the handle of a toothbrush. Additionally, none of the previously described toothbrushes utilize a ball and socket connection between the head portion and handle of a toothbrush to allow the user to selectively adjust the angle therebetween. Inasmuch as the art is relatively crowded with respect to these various types of toothbrushes, it can be appreciated that there is a continuing need for and interest in improvements to such toothbrushes, and in this respect, the present invention addresses this need and interest.

SUMMARY OF THE INVENTION

In view of the foregoing disadvantages inherent in the known types of toothbrushes now present in the prior art, the present invention provides an improved toothbrush. As such, the general purpose of the present invention, which will be described subsequently in greater detail, is to provide a new and improved toothbrush which has all the advantages of the prior art toothbrushes and none of the disadvantages.

To attain this, representative embodiments of the concepts of the present invention are illustrated in the drawings and make use of a toothbrush handle provided with a ball and a toothbrush head portion provided with a socket for receiving the ball. The socket may be in the form of a split collet provided with a slip ring for selectively tightening and releasing the collet socket about the pivot ball. In this manner, the angle between the head portion and the handle of the toothbrush may be selectively adjusted and the brush handle and head portion may be secured in the adjusted position. Alternatively, the pivot ball may be formed on the head portion and the collet socket may be formed on the handle portion. Another pivot mechanism which may be utilized with the present invention consists of a frictional engagement between the pivot ball and socket, such that the head portion will remain in adjusted angular position by virtue of the frictional engagement of the pivot ball with the socket. A third type of pivot mechanism includes a threaded sleeve which may be tightened or loosened to secure the pivot ball in adjusted position. In a preferred embodiment, the head portion of the toothbrush is provided with a forked portion having two opposed legs each provided with facing bristle portions for simultaneously brushing both sides of a tooth.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved toothbrush which has all the advantages of the prior art toothbrushes and none of the disadvantages.

It is another object of the present invention to provide a new and improved toothbrush which may be easily and efficiently manufactured and marketed.

It is a further object of the present invention to provide a new and improved toothbrush which is of a durable and reliable construction.

An even further object of the present invention is to provide a new and improved toothbrush which is susceptible of a low cost of manufacture with regard to both materials and labor, and which accordingly is then susceptible of low prices of sale to the consuming public, thereby making such toothbrushes economically available to the buying public.

Still yet another object of the present invention is to provide a new and improved toothbrush which provides in the apparatuses and methods of the prior art some of the advantages thereof, while simultaneously overcoming some of the disadvantages normally associated therewith.

Still another object of the present invention is to provide a new and improved toothbrush which allows selective angular adjustment between the head portion and the handle of the brush.

Yet another object of the present invention is to provide a new and improved toothbrush which has opposed facing brush portions on the toothbrush head which is pivotally connected to the handle portion of the brush.

Even still another object of the present invention is to provide a new and improved toothbrush which utilizes a ball and socket mechanism to allow selective angular adjustment between the head portion and the handle of the brush.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
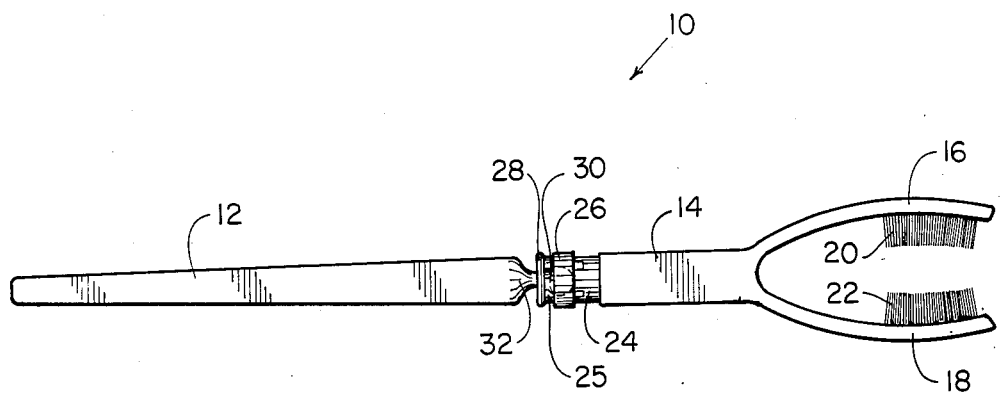
FIG. 1 is a plan view of a toothbrush according to a first embodiment of the present invention.

With reference now to the drawings, and in particular to FIG. 1 thereof, a new and improved toothbrush embodying the principles and concepts of the present invention and generally designated by the reference numeral 10 will be described.

More specifically, it will be noted that the first embodiment 10 of the invention includes a handle 12 and a head portion 14. The head portion 14 may be formed as a conventional single headed toothbrush or may be provided with a pair of legs 16 and 18 on which a pair of facing brushes 20 and 22 are secured. The bristles forming the brushes 20 and 22 may be formed of any conventional material and may be soft, medium or hard, or any combination of relative stiffness. A socket collet 24 is formed at one end of the head portion 14 and includes a plurality of circumferentially spaced slits 25. These slits provide resilience to the socket collet 24 and allow the side walls of the collet 24 to be radially expanded and contracted. A slip ring 26 is mounted around the outer circumference of the socket collet 24 for radially expanding and contracting the legs of the socket collet 24. A pivot ball 30 is formed on an end of the handle 12 and is received within a concave spherical seat within the socket collet 24. A tapered neck portion 32 of the handle 12 is provided between the pivot ball 30 and the main body of the handle 12. As will now be readily understood, by moving the slip ring 26 to the left as shown in FIG. 1, the legs of the socket collet 24 will be moved radially inwardly, thus rigidly securing the pivot ball 30 within the socket collet 24. By moving the slip ring 26 to the right as shown in FIG. 1, the legs of the socket collet 24 will be allowed to radially expand, thus allowing the pivot ball 30 to move freely within the concave spherical seat of the socket collet 24. The head portion 14 may thus be secured in any desired angular relation with the handle 12 of the toothbrush 10. A curved lip 28 formed at the end of the socket collet 24 serves to retain the slip ring 26 around the circumference of the socket collet 24. The reduced neck portion 32 prevents interference between the lip 28 and the handle 12, thus allowing a large range of motion for the head portion 14.

Figure 2:
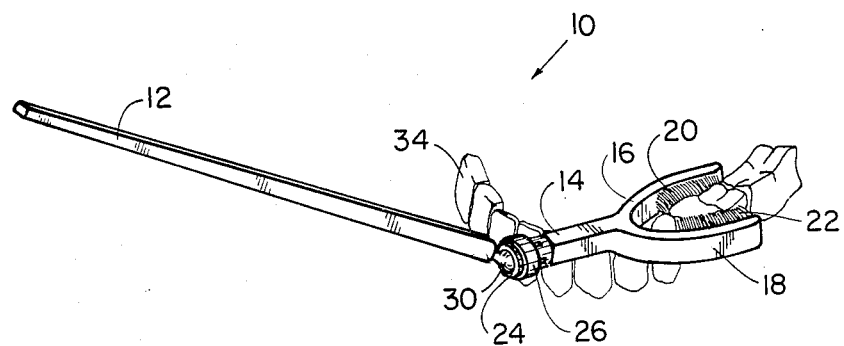
FIG. 2 is a perspective view of the first embodiment of the toothbrush in use.

With reference now to FIG. 2, it is seen that the brush 10 of the first embodiment of the present invention may be utilized to simultaneously brush both sides of the teeth 34 of a user. The head portion 14 may be secured in any desired angular adjusted position with respect to the handle 12.

Figure 3:
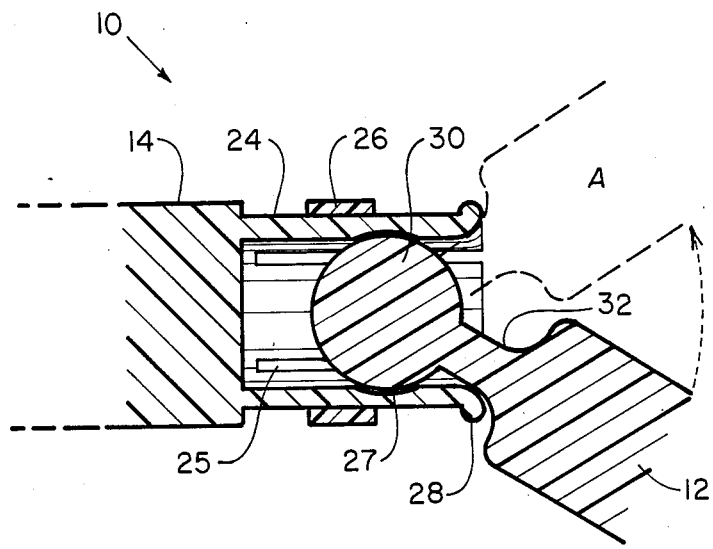
FIG. 3 is a cross sectional detail view of the pivot mechanism of the first embodiment of the present invention.

With reference now to FIG. 3, a cross sectional detail view of the pivot mechanism of the first embodiment 10 of the toothbrush of the present invention will now be described. It may now be seen that the pivot ball 30 on the reduced neck portion 32 of the handle 12 is received in a spherical concave seat 27 on the interior of the socket collet 24. With the slip ring 26 moved to the left, as shown in FIG. 3, the handle 12 may be pivoted to any desired position as illustrated by the arrow and dotted line outline A. When the desired angular relation between the head portion 14 and handle 12 of the toothbrush 10 is achieved, the slip ring 26 is slid along the outer cylindrical surface of the socket collet 24 to the right. This forces the legs of the socket collet 24 radially inwardly and presses the concave spherical seat 27 into frictional engagement with the pivot ball 30, thus locking the head portion 14 and handle 12 into the selected position. It will again be noted that the outwardly extending curved lip portion 28 serves to prevent the slip ring 26 from being moved off the end of the socket collet 24.

Figure 4:
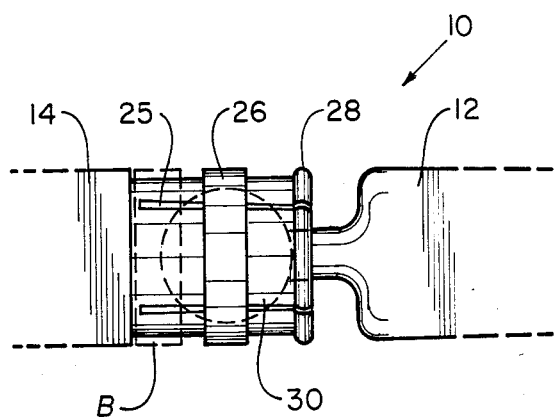
FIG. 4 is a plan detail view of the pivot mechanism of FIG. 3.

With reference now to FIG. 4, the position of the slip ring 26 in a released position is illustrated in dotted outline at B. In the illustrated position, the slip ring 26 is in a locked position, squeezing the walls of the collet slots 25 together and locking the pivot ball in the seat 27.

Figure 5:
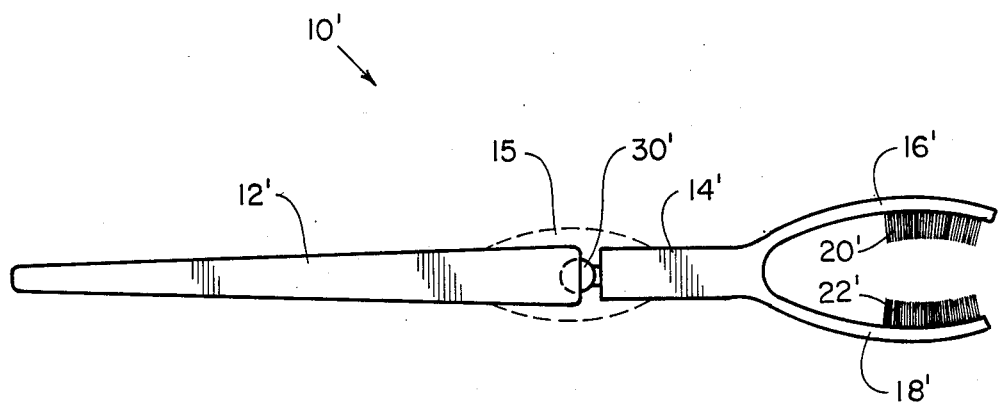
FIG. 5 is a plan view of a toothbrush according to a second embodiment of the present invention, utilizing a frictionally engaged ball and socket pivot mechanism.

With reference now to FIG. 5, a second embodiment 10' of a toothbrush according to the present invention will now be described. The toothbrush handle 12', head portion 14', legs 16', 18', brushes 20' and 22', are formed precisely as described with respect to the first embodiment illustrated in FIG. 1. However, in the second embodiment, the pivot ball 30' is received in tight fitting frictional engagement within a concave spherical socket formed in the handle 12'. Due to virtue of the frictional engagement of the pivot ball 30' in the socket, the head portion 14' will remain in the selected adjusted position. A flexible boot 15 may optionally be provided around the pivot ball 30' to prevent contamination of the pivot connection with foreign material. It should be noted that in the illustrated configuration the pivot ball 30' is attached to the head portion 14'. Of course, the obvious alternative configuration of mounting the pivot ball 30' on the handle 12' and forming the socket on the head portion 14' may be resorted to without departing from the scope of the present invention.

Figure 6:
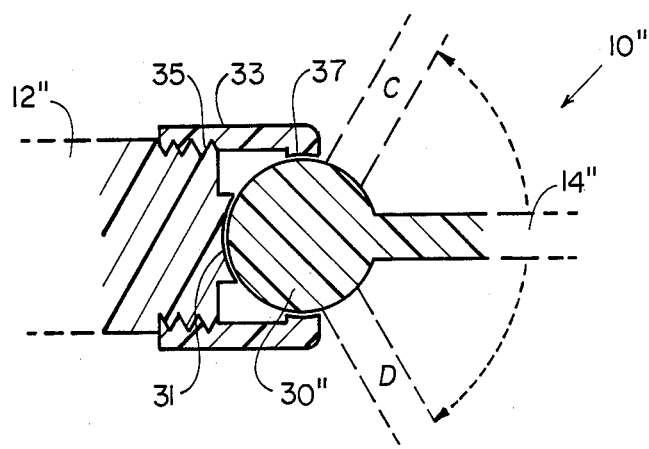
FIG. 6 is a cross sectional detail view of a pivot mechanism utilized in a toothbrush according to a third embodiment of the present invention.

With reference now to FIG. 6, a third embodiment 10" of a toothbrush according to the present invention will now be described. A pivot ball 30" is attached to the head portion 14" of the toothbrush 10". A concave spherical seat 31 is formed at the end of the handle 12". A sleeve 33 which has an aperture with a circumferentially extending seat 37 is secured by threads at 35 to the handle 12". The seat 37 of the sleeve 33 has a diameter slightly less than the diameter of the pivot ball 30". Thus, by tightening the sleeve 33, the pivot ball 30" may be locked against the concave spherical seat 31. Alternatively, by loosening the sleeve 33 along threads 35, the pivot ball 30" may be made free to move. In this position, the head portion 14" of the toothbrush 10" has a large degree of freedom of movement as illustrated by the positions illustrated in dotted outline at C and D. When the head portion 14" has been moved to the desired position, the sleeve 33 is then tightened, thus locking the handle 12" and head portion 14" in the selected angular position. Again, it is pointed out that the threaded sleeve 33 and seat 31 may be formed on the head portion 14" and the pivot ball 30" may be attached to the handle 12". This alternative construction is considered to be within the scope of the present invention.

The toothbrushes of the various embodiments of the present invention are preferably formed from a plastic material, with the collet 24 of the first embodiment 10 of the present invention formed from a somewhat flexible plastic material to allow the requisite degree of expansion and contraction. It is further contemplated that in each of the embodiments of the present invention that a flexible sealing boot may be provided around the ball and socket pivotal connection to prevent contamination of the mechanism with foreign material. This however, has been found not to be strictly necessary, as the pivot mechanism may be easily flushed with tap water.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A double headed pivotal toothbrush, comprising:
   a handle portion;
   a bifurcated head portion having spaced facing brushes;
   a pivotal connection between said handle portion and said head portion including a ball attached to said handle portion by an elongated reduced diameter neck and a longitudinally slotted socket collet attached to said head portion;
   said head portion and said socket integrally molded from a plastic material;
   a slip ring disposed around an outer surface of said socket collet for expanding and contracting said collet;
   a curved radially projecting circular lip formed at an outer end of said socket collet;
   an outer surface of said collet from said head portion to said radially projecting lip being generally cylindrical;
   and
   a concave spherical seat formed within said sicket collet.

2. The toothbrush of claim 1, further comprising sealing boot means around said pivotal connection.

* * * * *